United States Patent [19]
Barrett et al.

[11] 3,802,088
[45] Apr. 9, 1974

[54] GUIDANCE SYSTEM FOR UNDERWATER SWIMMERS

[75] Inventors: Frederick B. Barrett; Richard P. Tegt; Thomas V. Blattel, all of Camarillo, Calif.; Warren W. Staples, Kailua, Hawaii

[73] Assignee: The United States of America as represented by the Secretary of the Navy, Washington, D.C.

[22] Filed: June 14, 1971

[21] Appl. No.: 152,916

[52] U.S. Cl.................. 33/349, 33/361, 340/27 NA
[51] Int. Cl............................................. G01c 17/30
[58] Field of Search.......... 33/361, 349; 340/27 AT, 340/27 NA, 27 R; 325/361; 343/113; 179/1 UW

[56] References Cited
UNITED STATES PATENTS
| | | | |
|---|---|---|---|
| 3,355,705 | 11/1967 | Koerner.......................... | 340/27 AT |
| 2,744,232 | 5/1956 | Shawhan et al................... | 324/41 X |
| 3,237,584 | 3/1966 | Keithley, Jr...................... | 33/349 X |
| 2,407,536 | 9/1946 | Chapman........................ | 33/361 UX |
| 1,297,612 | 3/1919 | Valcauda.......................... | 33/349 |
| 2,118,082 | 5/1938 | Hammond........................ | 33/349 |

FOREIGN PATENTS OR APPLICATIONS
| | | | |
|---|---|---|---|
| 579,439 | 8/1946 | Great Britain...................... | 33/361 |

Primary Examiner—Robert B. Hull
Attorney, Agent, or Firm—Richard S. Sciascia; J. M. St. Amand

[57] ABSTRACT

A torso-mounted guidance package to be worn by an underwater swimmer. It incorporates a magnetometer circuit supplying earphoes with dichotic and proportional course error signals. These signals are in the form of stimuli presented selectively to either the right or left ear of the swimmer, thereby providing him with information as to how far he is deviating from an on-course heading to a pre-selected destination.

2 Claims, 5 Drawing Figures

GUIDANCE SYSTEM FOR UNDERWATER SWIMMERS

BACKGROUND OF THE INVENTION

The development of self-contained underwater breathing apparatus and other life-support equipment has been rapid in recent years. This has occasioned a pressing need to improve underwater swimmer navigation in order to better exploit the underwater environment.

The guidance technique in present use is based upon the visual luminescent magnetic compass, which is customarily mounted on a swim board held by the swimmer's hands so that the compass is visible. It requires the use of both hands, and is not accurate for course maintenance since it is subject to the northerly turning error, the east-west acceleration error, dip angle related errors, and to board orientation difficulties by the swimmer. Also, the compass is subject to reading limitations underwater. Still further, use of such a system requires training and experience in board positioning and interpretation of compass readings. In view of these factors, accurate and reliable underwater swimmer guidance is not possible when such equipment is utilized.

SUMMARY OF THE INVENTION

A system has been developed to meet the following requirements:
1. It should be totally self-contained.
2. It should offer accurate guidance capability over a straight line range of at least one mile.
3. It must be compatible with a marine environment, not requiring swimmer vision.
4. It must not radiate excessive energy so as to increase the possibility of detection by an enemy.
5. It must not significantly interfere with the operational and/or assigned tasks of the swimmer.

In accordance with a preferred embodiment of the invention, the equipment worn by the underwater swimmer includes a pair of earphones and magnetometer which measures the strength of the earth's magnetic field, producing a proportional alternating output voltage. The phase of this voltage is compared to the phase of an alternating excitation or reference voltage to determine if the error is to the left or to the right. A stimulus is fed to the right or left earphone, depending on the direction of the error; when the swimmer is "on course," no stimulus is received.

STATEMENT OF THE OBJECTS OF THE INVENTION

One object of the present invention, therefore, is to provide an improved guidance system for underwater swimmers.

Another object of the invention is to provide a self-contained guidance system of the type described which is accurate over a range up to at least one mile.

A further object of the invention is to provide an underwater guidance system of the type described which does not require visual observation on the part of the swimmer by whom the equipment is carried.

A still further object of the invention is to provide a system of the type described which does not require use of the swimmer's hands or significantly interfere with his normal movements underwater.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
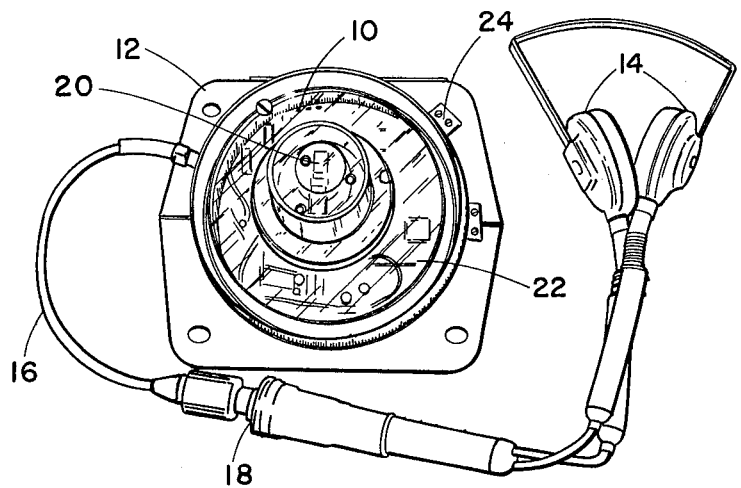
FIG. 1 is a plan view of an underwater swimmer guidance system designed in accordance with a preferred embodiment of the present invention.

The swimmer guidance system of the present invention, in one embodiment, is made up of the components illustrated in FIG. 1 of the drawings. These include a waterproof housing 10, preferably composed of transparent acrylic material, mounted on a base plate 12 fabricated from some corrosion resistant substance such as brass. A pair of earphones 14 are connected to the housing 10 by a cable 16 having a detachable connector 18 included therein to facilitate separation of the earphones when the system is not in use. The housing 10 (further shown in FIG. 3 of the drawings) has an upper or turret portion 20 resting on a cylindrical section 22 of greater diameter, the latter being secured so as to be rotatable on the base plate 12 and held in position by any suitable means such as the lock screw 24.

Figure 2:
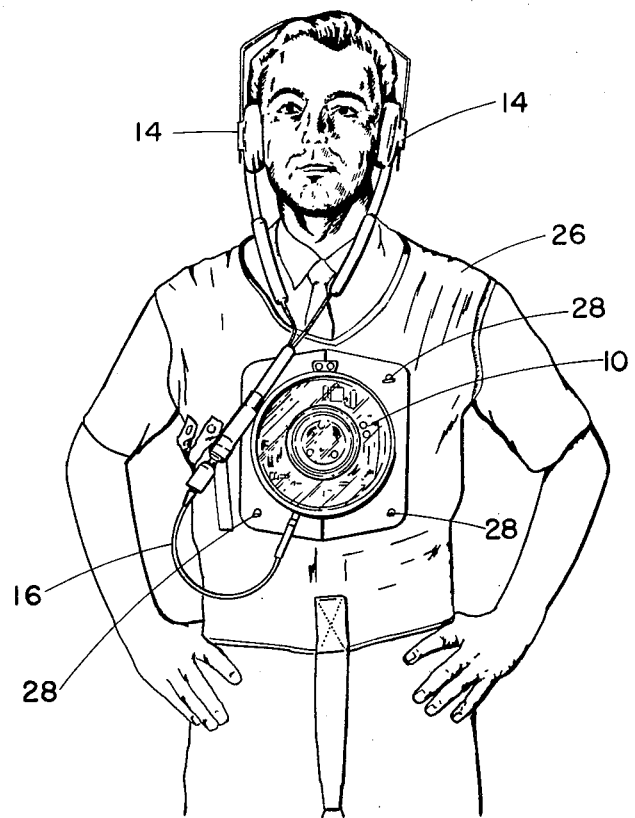
FIG. 2 is a front view of an individual wearing the guidance system of FIG. 1.

The plate 12 is attached to a canvas vest 26 or wet suit worn by the swimmer to be guided, as shown in FIG. 2. If the swimmer wears a wet suit, the vest 26 is worn over such garment. The plate 12 may be detachably secured to the vest 26 or wet suit by a plurality of swivel-type fasteners 28, as illustrated. Accordingly, when the individual is in normal swimming position, the base plate 12 is oriented essentially in a horizontal plane. However, as will be brought out hereinafter, the guidance system of the present invention is designed to take into account a mean pitch and roll and total displacement range for the swimmer, allowing for plus 20° and minus 20° freedom in the pitch and roll planes.

Figure 3:
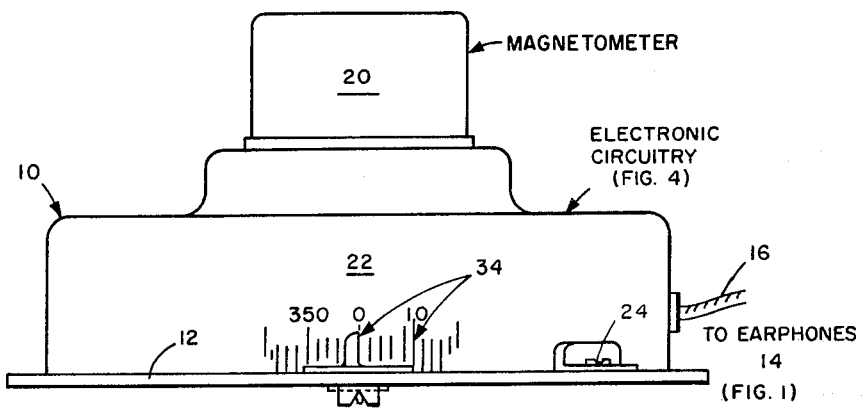
FIG. 3 is a side view of the housing for the electronics of the system of FIGS. 1 and 2.
Figure 4:
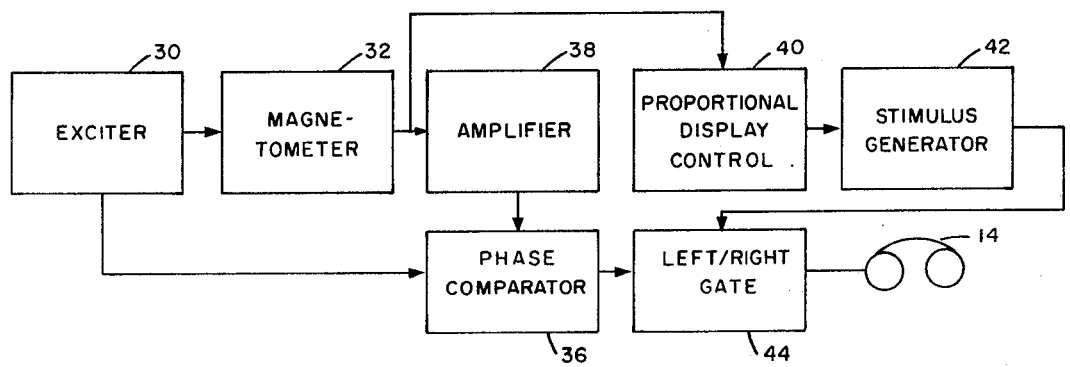
FIG. 4 is a schematic diagram in block form of an electrical circuit such as might be used in the guidance system of FIGS. 1, 2 and 3.
Figure 5:
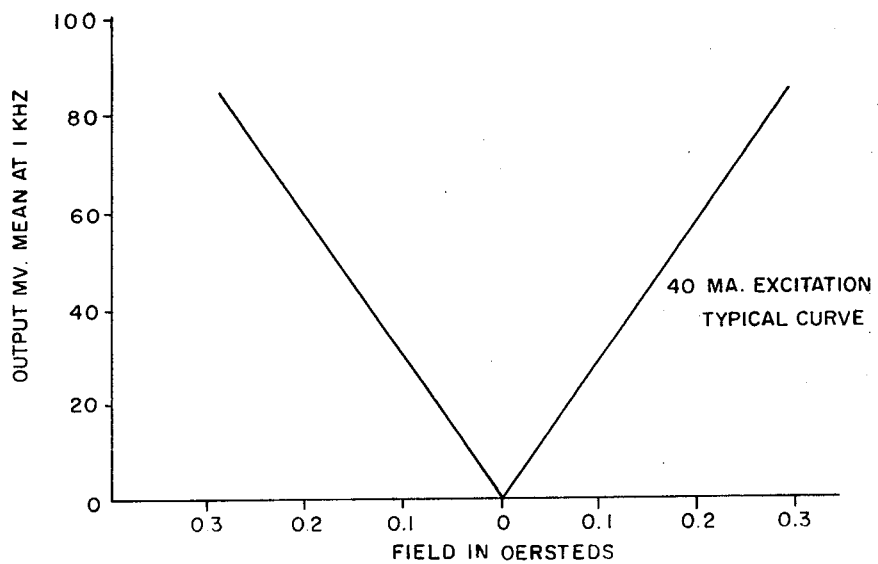
FIG. 5 is a response curve illustrating the operation of one of the components of the circuit of FIG. 4.

As indicated in FIG. 3 of the drawings, the turret portion 20 of the housing 10 encloses a magnetometer, while the base portion 22 holds the electronic circuitry, one example of which is illustrated in FIG. 4. In the latter figure, an exciter 30 of conventional design has its output applied to a magnetometer 32. This device provides a means of measuring the strength of the earth's magnetic field by developing a proportionate alternating output voltage. One design, known in the art, may consist of two high-permeability wires each wound along its length with an excitation winding through which an alternating current is passed so as to cause partial saturation of the wires. The voltages induced in the secondary winding from the two excitation windings are balanced and produce no net secondary voltage in the absence of an external magnetic field. If, however, an external magnetic field has a component along the axis of the element, the saturation of the wires becomes assymetrical and a resultant voltage appears at the secondary having twice the frequency of excitation. This output voltage is directly proportional to the axial component of the magnetic field, and inverts in phase when the field polarity is reversed. FIG. 5 illustrates the relationship of the magnetometer voltage output to the strength of the magnetic field. The output voltage characteristic is linear and proportional to magnetic field strength. The adjustable compass setting elements 34 (shown in FIG. 3) permit the initial course null setting, the width of this null being electrically adjustable.

Returning now to FIG. 4, the output of the exciter 30 is also applied to a phase comparator 36, the latter receiving as well the signal from the magnetometer 32 after amplification by unit 38. The magnetometer output is also fed to the proportional display control device 40 and thence to the stimulus generator 42. A left-right gate 44 receives both the output of generator 42 and the output of phase comparator 36 and supplies the resulting signal to the headphones 14.

It should be noted that there is an output from the magnetometer 32 only when the latter is unbalanced, as discussed above. The stimulus generator 42 provides an auditory frequency tone that is fed to the left-right gate 44, the latter channeling the output of the phase comparator 36 to the proper side of the headphone unit 14, and also modulating this output with a course error display signal tone. The proportional display control 40 picks off a portion of the magnetometer output voltage, the amount of this voltage determining the pulse repetition frequency of the stimulus generator 42, and pulsing this generator when the error in course heading (set by the elements 34) is greater than approximately 10 degrees.

It will now be recognized that the circuit of FIG. 4 drives the headphones 14 with dichotic and proportional course error display signals. These signals yield different stimuli to the two ears. The proportional course error signals provide the swimmer with information as to how far he is deviating from an on-course heading and also provide basic course laterality information, thereby aiding a user of this equipment who may become disoriented before he reaches his objective.

The guidance system herein disclosed has proven highly satisfactory in practice. In trials of approximately 200 yards length, it has been found that swimmers have been able to remain consistently within a three degree wide auditory on-course null path. After gaining experience in the use of the equipment, an auditory off-course signal was received about every three swim kicks, enabling the swimmer to return to an on-course null for about three more swim kicks. The swim rate was about one mile per hour. The mean guidance error was found to be 2.14 degrees, with a range from 6 degrees left to 6 degrees right, a one degree error being about 3.5 yards in a 200-yard swim.

It has been found that the battery power supply, located within a housing portion 22, provides capability for a two-mile swim, power to the unit being preferably actuated by the addition of the headphones 14 to the assembly when the two portions of connector 18 are brought together.

Although the invention has been described in connection with underwater swimmer guidance, it will be apparent that the base plate 12 may be mounted on any propellable object designed to float upon (or move below) the surface of any body of water, the headphones 14 being replaced by any known type of automatic steering system controlled by the output of the gate 44.

Obviously many modifications and variations of the present invention are possible in the light of the above teachings. It is therefore to be understood that within the scope of the appended claims the invention may be practiced otherwise than as specifically described.

We claim:

1. A guidance system for underwater explorations comprising:
transportable means for sensing an external magnetic field and developing a proportionate alternating voltage when the transportable means is so oriented that the magnetic field has a component along a predetermined null axis; said transportable means including compass elements azimuthally adjustable for setting a predetermined null axis to provide an initial heading;
means connected to said sensing means for producing an electrical voltage representing proportional heading error, the amplitude of which is directly proportional to the magnitude of the field component present along the null axis;
an audible tone generating means receiving the output from the proportional heading error voltage producing means, the pulse repetition frequency of the audible tone generator being varied in proportion to the amount of error voltage received;
a pair of headphones worn by an underwater swimmer receiving the output from the audible tone generating means;
gating means connected to the output of the audible tone generating means for directing the audible tone to the left earphone when the course deviation is to the left and to the right earphone when the course deviation is to the right whereby the underwater swimmer receives a signal indicating the magnitude and direction of any deviation from the initial heading; and
a waterproof housing enclosing the transportable sensing means, the proportional heading error voltage producing means, the audible tone generator and the gating means; said waterproof housing including a base plate adapted for attachment to an underwater swimmer.

2. The guidance system of claim 1 wherein the transportable means for sensing an external magnetic field is a magnetometer sensing the earth's magnetic field.

* * * * *